United States Patent [19]
Van Cleave, Jr.

[11] 3,851,188
[45] Nov. 26, 1974

[54] TRANSISTORIZED HIGH VOLTAGE COMPLEMENTARY SWITCH FOR PULSING A NUCLEAR GENERATOR

[75] Inventor: Robert A. Van Cleave, Jr., Stafford, Tex.

[73] Assignee: Texaco Inc., New York, N.Y.

[22] Filed: Aug. 22, 1972

[21] Appl. No.: 282,732

Related U.S. Application Data
[63] Continuation-in-part of Ser. No. 148,130, May 28, 1971, abandoned.

[52] U.S. Cl.................. 307/255, 307/262, 307/268, 307/313
[51] Int. Cl. .......................................... H03k 17/00
[58] Field of Search .......... 307/255, 262, 263, 268, 307/270, 313

[56] References Cited
UNITED STATES PATENTS

| | | | |
|---|---|---|---|
| 2,981,895 | 4/1961 | Koch | 307/313 X |
| 3,312,941 | 4/1967 | Booth et al. | 307/255 X |
| 3,319,086 | 5/1967 | Yee | 307/288 |
| 3,488,525 | 1/1970 | Stover et al. | 307/255 |
| 3,526,788 | 9/1970 | Stover et al. | 307/313 X |
| 3,538,350 | 11/1970 | Stover et al. | 307/255 |

Primary Examiner—Stanley D. Miller, Jr.
Attorney, Agent, or Firm—T. H. Whaley; C. G. Ries

[57] ABSTRACT

A transistorized complementary switch for pulsing a nuclear generator. There is one series section of PNP transistors and another series section of NPN transistors, each series section being connected in common base configuration. Each section is alternately driven to high and low impedance conditions to provide the required pulse output.

4 Claims, 7 Drawing Figures

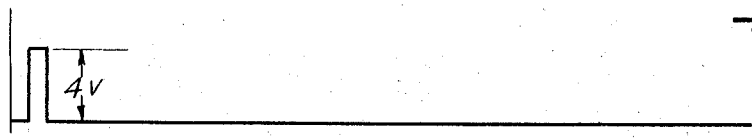
Fig. 2. Reset Pulse Point I — 4V
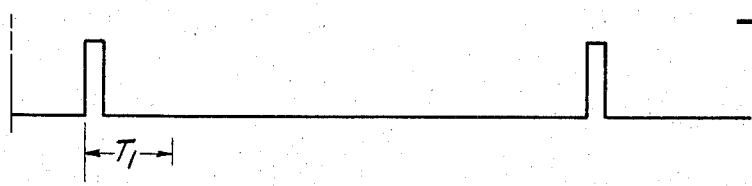
Fig. 3. Initial Pulse Point J — $T_1$
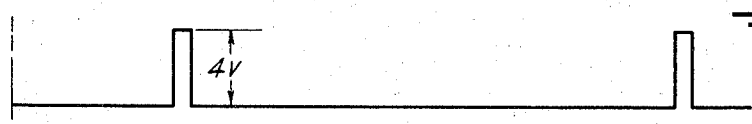
Fig. 4. Final Pulse Point I — 4V
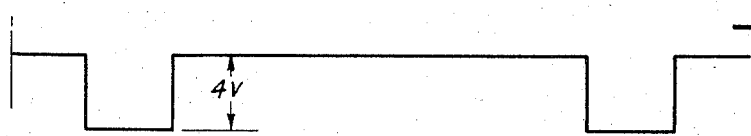
Fig. 5. Point K — 4V
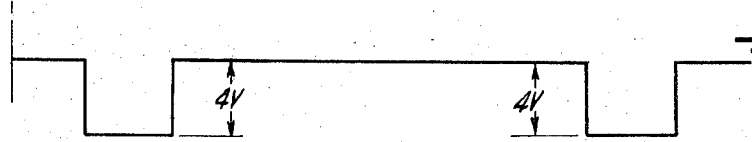
Fig. 6. Point L — 4V, 4V
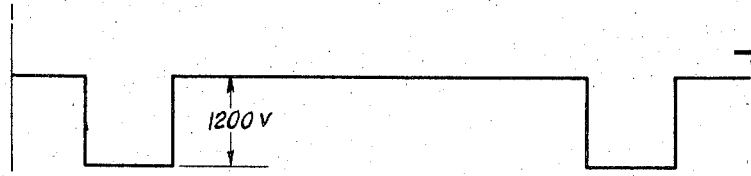
Fig. 7. Output Pulse Point M — 1200 V
Time →

3,851,188

TRANSISTORIZED HIGH VOLTAGE COMPLEMENTARY SWITCH FOR PULSING A NUCLEAR GENERATOR

CROSS REFERENCE TO RELATED APPLICATIONS

This application is a continuation-in-part to U.S. Application Ser. No. 148,130 filed May 28, 1971, and now abandoned by Robert A. Van Cleve, Jr.

BACKGROUND OF THE INVENTION

This invention pertains, in general, to switching or pulse circuitry; and, in particular, to circuitry for providing relatively high amplitude voltage pulses at high repetition rates, with each pulse having a relatively short duration pulse width and a fast rise time as well as a fast decay time.

Switching or pulse circuitry of the type hereinbefore mentioned are useful in connection with, among other applications, nuclear well logging systems of the so-called pulsed neutron type which are disclosed in, among others, the U.S. Pat. Nos. 3,102,956; 3,164,720; and 3,256,438. For example, in the pulsed neutron type of well logging system an accelerator type neutron generator is employed wherein positive ions are forced into an accelerating electric field where these ions are then accelerated until they pass a ground plate. After passing the ground plate the ions pass to a target (e.g., a tritium target) whereupon the ions bombard the target which, in turn, releases neutrons.

The aforementioned accelerator type of neutron generator includes sets of deflection plates which apply additional electric fields of short time duration to the ions so that they impinge upon the target in short bursts. Proper operation of the accelerator type neutron generator requires the switching of relatively high voltages across the various sets of deflection plates in order to properly guide the beam of ions to the target. It is necessary to employ a switching scheme wherein the voltage pulses applied to the deflection plates have a high amplitude optimum pulse shape with a high repetition rate. Optimum pulse shape for the aforesaid purpose dictates that each applied pulse be of relatively short duration, or pulse width, and have a fast rise time as well as a fast decay, or fall time. For example, with one kind of commercially available neutron generator it is desirable to switch voltage pulses having an amplitude of 1,200 volts at repetition rates of 10 Hz to 100 kHz; the pulses having widths of $5 \times 10^{-6}$ sec. to $100 \times 10^{-3}$ sec., with rise and decay times being about $120 \times 10^{-9}$ sec. and $200 \times 10^{-9}$ sec. The aforesaid rise and decay times are minimized in order to provide optimum pulse shapes.

SUMMARY OF THE INVENTION

One object of the invention is to provide circuitry for delivering, at high repetition rates, pulses having relatively short pulse widths and relatively high amplitudes together with fast rise and fast decay times.

Another object of the invention is to provide pulse, or switching, circuitry suitable for pulsing neutron generators.

Another object of the invention is to provide circuitry suitable for pulsing neutron generators such as those employed in nuclear well logging systems.

Another object of the invention is to provide switching or pulse circuitry which dissipates a minimal amount of power.

Other objects and advantages as well as the various features of novelty which characterize the invention are pointed out with particularity in the claims annexed herewith and forming part of the specification. For a clearer understanding of the invention, its operating advantages and the specific objects obtained by its use reference to be had to the accompanying drawing figures and to the following descriptive matter in which there is illustrated and described an illustrative embodiment of the invention.

BRIEF DESCRIPTION OF THE DRAWING FIGURES

FIGS. 2–7 are diagrams of various pulses at different terminals, or points, in the circuit of FIG. 1.

DETAILED DESCRIPTION OF THE INVENTION

Figure 1:
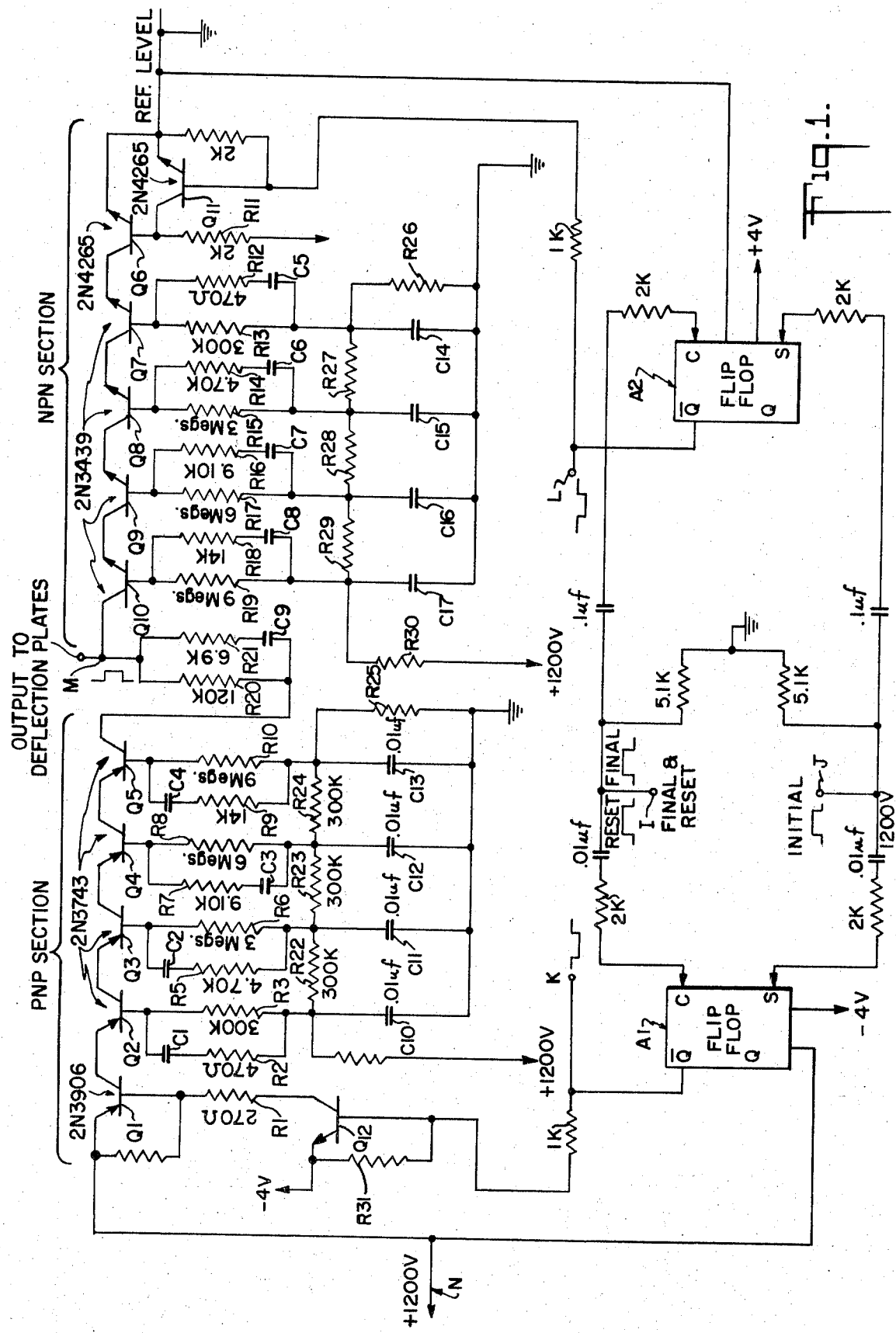
FIG. 1 is a schematic diagram of a complementary switch or pulsing circuit according to the invention.

The transistorized complementary switch according to the invention is shown in FIG. 1. A series of transistors of the PNP type are connected in series to form a PNP section of a transistorized complementary switch. These transistors, which are serially connected, are the transistors designated as Q1, Q2, Q3, Q4, and Q5. Being serially connected and in a common base configuration the collector electrode of transistor Q1 is directly coupled to the emitter electrode of transistor Q2. The collector electrode of transistor Q2 is connected to the emitter of transistor Q3. The collector of transistor Q3 is directly connected to the emitter of transistor Q4 and the collector of transistor Q4 is directly connected to the emitter of transistor Q5.

Another complementary section of the transistorized switch is comprised of a series of serially connected NPN transistors Q6, Q7, Q8, Q9 and Q10, which being serially connected are also arranged in a common base configuration. As shown, the emitter electrode of transistor Q10 is directly coupled to the collector of transistor Q9. The emitter of transistor Q9 is directly coupled to the collector of transistor Q8. The emitter of transistor Q8 is directly coupled to the collector of transistor Q7 and the emitter of transistor Q7 is directly coupled to the collector of transistor Q6.

As shown, another NPN type transistor Q11 is provided in the NPN section of serially connected common base transistors Q6 through Q10. The collector electrode of transistor Q11 is directly coupled to the base electrode of transistor Q6. The series transistors Q6 through Q10, which form a common base NPN configuration of the complementary switch, are in effect driven by the transistor Q11 which is arranged in a common emitter configuration with reference to the common base configuration of series transistors Q6 through Q10. The transistors Q6, Q7, Q8, Q9 and Q10 are power transistors and the driving transistor Q11 of the common emitter arrangement is a high frequency transistor. A high frequency common emitter stage is used to speed up switching by emitter triggering of transistors Q6 through Q10. Similarly, another transistor Q12 which is also an NPN type transistor is provided as a driving transistor for the common base arrangement of the series connected PNP transistors Q1 through Q5 for the same reason. Transistors Q1 through Q5 are also power transistors and the transistor Q12 is a high frequency transistor connected in common emitter configuration with respect to the series transistors of the PNP section, i.e., transistors Q1 through Q5. As shown, the emitter electrode of the driving transistor Q12 is directly connected to a negative voltage source (−4 volts referenced to +1,200 volts). Similarly, the emitter electrode of transistor Q11 in the NPN section of the complementary switch is directly coupled to a reference voltage level. Also the collector electrode of transistor Q11 is directly coupled to the base of transistor Q6 and to a positive source of +4 volts, as shown.

In the PNP section of the series connected transistors Q1 through Q5 there is associated with the base circuits thereof a network of resistors and capacitors (connected as indicated in FIG. 1) for the purpose of, among other things, regulating the turn-on time, turn-off time and pulse shape delivered by the PNP section of the complementary switch. As shown, the resistor R1 is connected in series between the base electrode of transistor Q1 and the collector electrode of the driving transistor Q12. Associated with the base circuit of transistor Q2 is the series branch comprising the resistor R2 and capacitor C1. Connected in shunt configuration with resistor R2 and capacitor C1 is another resistor R3. Similarly, there is associated with the base electrode, in the manner shown, with transistor Q3 the series resistor R5 and capacitor C2 which are in shunt relationship with the resistor R6. Likewise, with the base electrode of transistor Q4 there is the series resistor R8 which is in shunt configuration with the resistor R7 and its series capacitor C3. Finally, with the base electrode of transistor Q5, the resistor R10 is arranged in shunt configuration with the series branch comprising the resistor R9 and the capacitor C4.

In the NPN section of the complementary switch there is associated with the base of the transistor Q6 the resistor R11 which, as shown, is directly coupled between the base of transistor Q6 and a +4 volt source. Associated with the base of the transistor Q7 is the resistor R13 which as shown is shunted by the series branch consisting of the resistor R12 and the capacitor C5. Similarly, there is associated with the base electrode of the transistor Q8 the series resistor R15 which is shunted by the branch comprising the resistor R14 and the capacitor C6. The base electrode of the transistor Q9 is coupled with the series resistor R17 which, in turn, is shunted by the resistor R16 and the capacitor C7. Finally, there is associated with the base electrode of the transistor Q10 the series resistor R19 which in turn is shunted by the series branch comprising the resistor R18 and the capacitor C8.

As shown, the collector electrode of the transistor Q10 is directly coupled to an output terminal M. Similarly the final transistor Q5 in the complementary PNP section is coupled to the output terminal M by means of the network comprising the series resistor R20 and the shunt branch resistor R21 and capacitor C9 as shown in FIG. 1.

As shown in FIG. 1 the PNP section of the transistorized complementary switch also has a voltage divider network associated with the base of the transistors Q2, Q3, Q4 and Q5. This voltage divider network is comprised of the series resistors R22, R23, R24 and R25, the latter resistor being connected as shown to the reference level. Also connected in this voltage divider network in the manner shown in FIG. 1 are the capacitors C10, C11, C12 and C13. An additional resistor R31 is included, as shown, and this resistor, R31, is directly connected to a positive source of +1,200 volts.

Similarly the NPN section of the transistorized complementary switch also has a voltage divider network associated therewith. As shown, there is coupled with the base electrodes of the transistors Q7, Q8, Q9 and Q10 the configuration of a series transistors R26, R27, R28, R29 and the resistor R30. The latter resistor, R30, is as shown directly coupled with a positive source of +1,200 volts. Also the resistor R26, as shown, is directly coupled to the reference level voltage. In addition, the capacitors C14, C15, C16 and C17 are included in the voltage divider network and connected in the manner indicated with the resistors hereinbefore mentioned.

Also shown in FIG. 1, below the voltage divider networks, hereinbefore discussed, are two flip-flops designated A1 and A2. Each of the flip-flops A1 and A2 are commercially available units of the Fairchild Corporation and are designated as Fairchild uL914 units. Flip-flip A1 receives +1,200 volts as its Vcc voltage and its common terminal receives −4 volts. Flip-flop A2 receives +4 volts as its Vcc voltage and its common terminal is connected to ground. As shown in FIG. 1, the network including the two flip-flops A1 and A2 are provided with the terminals or points I, J, K and L. The activities of various voltage pulses at these terminals and at the output terminal M are discussed hereinafter with reference FIGS. 2, 3, 4, 5, 6 and 7.

The circuit shown in schematic form in FIG. 1 is employed for the purpose of changing the voltage at output terminal M from +1,200 volts above reference voltage and subsequently back to +1,200 volts after a preset time. Operationally, the circuit of FIG. 1 works as follows.

The +4 volt and −4 volt (referenced to +1,200 volts) power sources are energized at the same time the 1,200 volt source is energized, and a positive reset pulse is injected into the circuit at terminal I causing flip-flops A1, A2 to clear. See FIG. 2. This causes the voltage at terminal K to rise from 1,196 volts to +1,200 volts making the voltage present at terminal M 1,200 volts as a result of flip-flop A1 being cleared. See FIG. 5 for the voltage waveform at terminal K. The aforementioned activities cause the transistors in the PNP section of the complementary switch to turn on; i.e., to assume a low impedance condition. At the same time terminal K is changing voltage, the voltage at terminal L (See FIG. 6) is changing to +4 volts with respect to the reference voltage as a result of flip-flop A2 being clear. This activity causes the NPN section of the complementary switch to turn off; i.e., to assume a high impedance condition. Now, any voltage at terminal N will appear at the output terminal M because the PNP section of the complementary switch has a low impedance and the NPN section has a high impedance. At this time, a positive initial pulse is injected into the circuit at terminal J, thereby setting flip-flops A1 and A2. This causes the voltage at terminal K to change from 1,200 volts to 1,196 volts as a result of flip-flop A1 being in a set state. This causes the PNP section of the complementary switch to turn off. When the initial pulse is injected into this circuit the voltage at terminal L changes to the reference voltage as a result of flip-flop A2 being in a set state. This causes the NPN section of the switch to turn on. Now, since the PNP section is off or in a high impedance condition and the NPN section is on or in a low impedance condition, the voltage at output terminal M goes to the reference voltage. After a preset time a positive final pulse is injected into the circuit at terminal I. This causes the same action as a reset pulse. Therefore, the voltage at output terminal M will go back to 1,200 volts.

The injection of initial and final pulses may continue indefinitely which would give a periodic changing of the voltage at output terminal M.

Although in FIG. 1 the particular values of the various circuit elements have been indicated in the drawing figure, it is to be understood that these specific ratings and values are for the purpose of illustrating a particular circuit embodying the invention and that such specificity is to be considered as illustrative of, rather than limitive of, the invention.

While a specific embodiment of the invention has been shown and described in detail, to illustrate the application of the inventive principles involved it is to be understood that the invention may be otherwise embodies without departing from such principles.

What is claimed is:

1. Circuitry for delivering large amplitude voltage pulses at high repetition rates with each pulse having a relative short pulse width and fast rise and decay times, comprising a plurality of PNP transistors, each transistor having an emitter, collector and base, said PNP transistors being serially connected such that the emitter of each PNP transistor of the plurality of PNP transistors, except a first PNP transistor, is connected to the collector of a preceding PNP transistor; a plurality of NPN transistors, each transistor having an emitter, collector and base, said NPN transistors being serially connected such that the emitter of each NPN transistor of the plurality of NPN transistors, except for a first NPN transistor, is connected to the collector of a preceding NPN transistor; first circuit means including an output terminal for coupling the collectors of a last PNP transistor of the plurality of PNP transistors and of a last NPN transistor of the plurality of NPN transistors to said output terminal; second circuit means, including an RC ladder network, coupled to the bases of all PNP transistors, except the first PNP transistor, for dividing voltages among said coupled PNP transistors and regulating the conduction time thereof; third circuit means, including an RC ladder network, coupled to the bases of all NPN transistors, except the first NPN transistor, for dividing voltages among said coupled NPN transistors and regulating the conduction thereof; a pair of input terminals; first pulse means connected to the input terminals for providing a pulse output having a predetermined amplitude referenced to a large amplitude voltage in response to a first pulse applied to one input terminal and to a second pulse applied to the other input terminal; second pulse means connected to the input terminals for providing a pulse output, having said predetermined amplitude references to ground, in response to said first pulse applied to said one input terminal and to said second pulse applied to said other input terminal; means connected to said first pulse means for providing a large amplitude voltage to said first pulse means and to the emitter of said first PNP transistor; means connected to said second pulse means for providing a ground reference to said second pulse means and to the emitter of said first NPN transistor; means connecting said bases of said first PNP transistor and said first NPN transistor to said first and second pulse means, respectively, for driving said pluralities of transistors in accordance with the outputs from said first and second pulse means so that a pulse appears at said output terminal having an amplitude corresponding to said large amplitude voltage with respect to ground.

2. The circuitry according to claim 1 further comprising circuit means associated with each PNP and NPN transistor, except said first PNP and said first NPN transistor for rapidly setting each PNP and NPN into conduction and nonconduction states.

3. The circuitry according to claim 1 wherein said driving means includes NPN transistors with each said drive transistor having its collector connected to the base of said first PNP and said first NPN transistor, respectively.

4. The circuitry according to claim 1 wherein each said plurality of transistors in series is connected in the common base configuration.

* * * * *